Patented Aug. 24, 1937

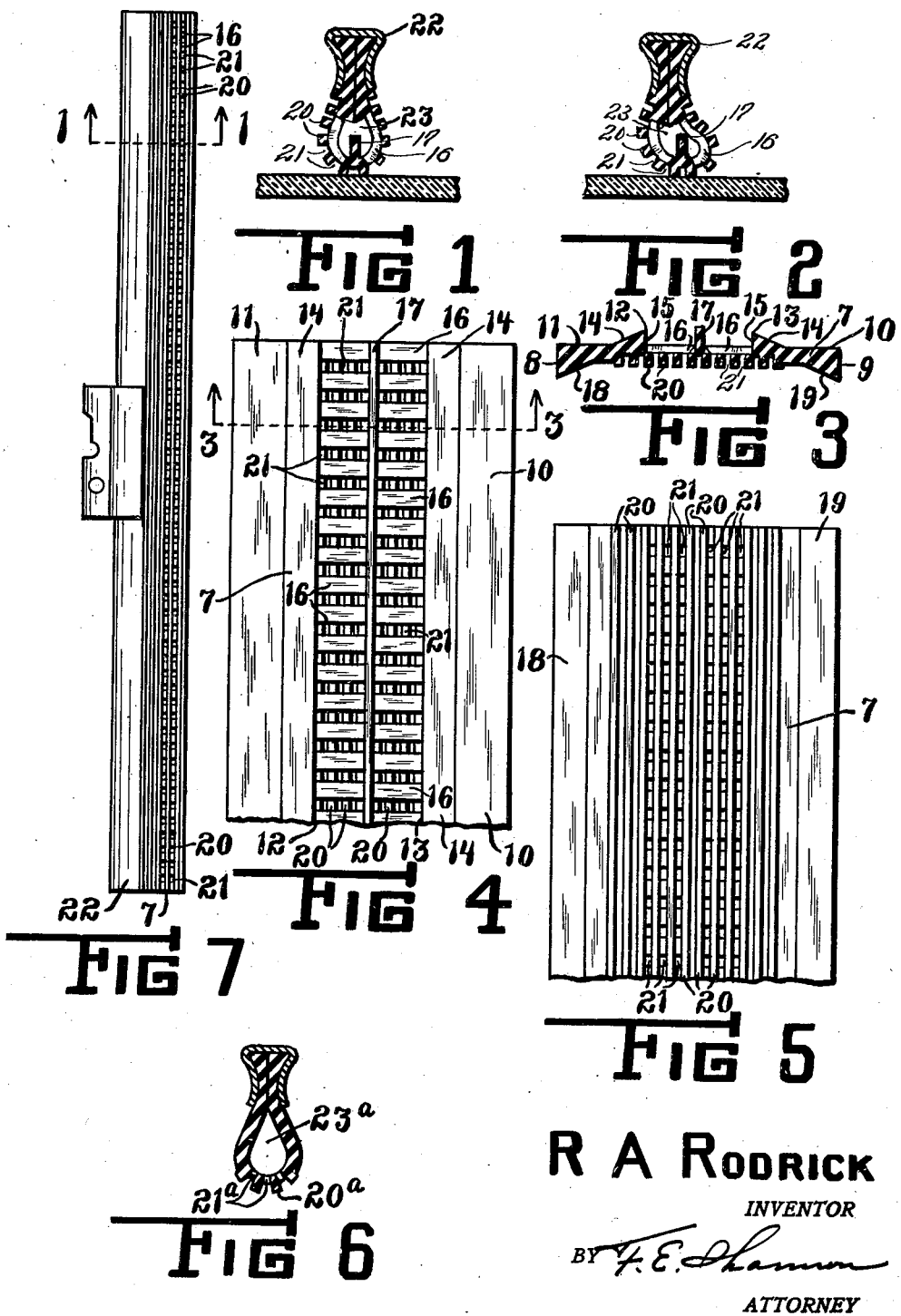
Aug. 24, 1937.   R. A. RODRICK   2,090,701
WIPER ELEMENT
Filed Feb. 27, 1935    2 Sheets-Sheet 1
R A RODRICK
INVENTOR

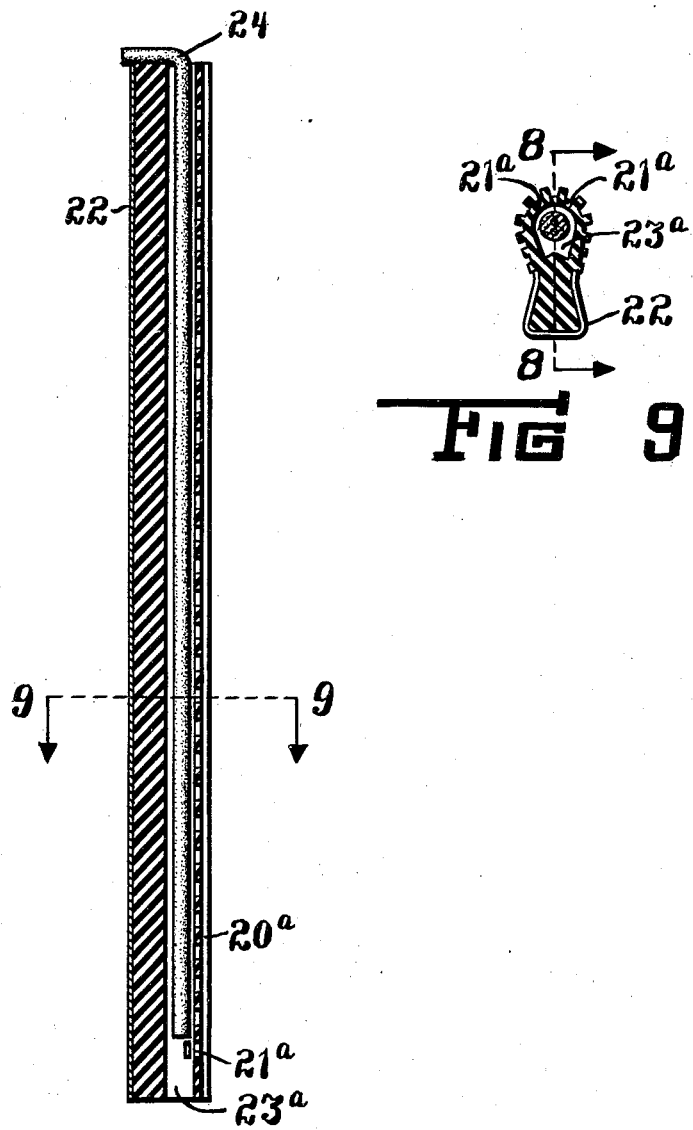

2,090,701

UNITED STATES PATENT OFFICE 2,090,701

WIPER ELEMENT

Raymond A. Rodrick, Akron, Ohio

Application February 27, 1935, Serial No. 8,495

16 Claims. (Cl. 15—245)

This invention relates to improvements in wiper elements and while intended for general use wherever it may be advantageously employed, the invention is particularly adapted for application to a cleaning blade for windshield wiping devices in which connection it is illustrated in the drawings and hereinafter described.

Objects of the invention are to provide a wiping element of simple, economical construction which will have an improved squeegee action and which will be particularly efficient in maintaining a windshield or other window in a cleaned condition.

Other objects are to provide a wiping element having a plurality of squeegee ribs on the contacting face thereof and having a drainage passage extending longitudinally thereof with communicating openings in the wall thereof whereby a portion of the water wiped from the glass may escape through the drainage passage; to provide a tubular wiping element having a contacting face portion composed of spaced, longitudinally directed ribs supported by lateral ribs formed integrally therewith with the spaces between certain of said ribs forming apertures leading to said drainage passage and to thereby provide a wiping element which will readily yield to conform to all irregularities in the glass and which will at all times provide an efficient squeegee action.

Additional objects are to provide a wiper element having a tubular contacting portion with apertures leading to the bore thereof with said apertures spaced outwardly from each squeegee rib and to provide means for preventing flow of water from one side of the wiper through said apertures and bore to the other side thereof.

The above objects, which may be considered separately or collectively, are accomplished by the construction hereinafter described with reference to the accompanying drawings in which there is shown an illustrative embodiment of the invention, it being understood that changes and modifications may be made which come within the spirit of the invention as hereinafter claimed.

In the drawings:

Figure 1 is a cross sectional view of a wiper blade constructed in accordance with this invention, taken as indicated by the lines 1—1 of Figure 7, the same being shown as initially positioned on a piece of glass, the glass being shown in fragmentary cross section.

Figure 2 is a similar view illustrating the blade as it is distorted during a wiping movement.

Figure 3 is a cross sectional view of a strip employed to form a wiping element constructed in accordance with this invention, the same being taken as indicated by the lines 3—3 of Figure 4, Figure 4 is a plan view showing the inner face of said strip, a portion of same being broken away to conserve space, Figure 5 is a similar view showing the outer face thereof, Figure 6 is a cross sectional view showing a modified form of the invention.

Figure 7 is a side elevational view of a windshield wiper blade constructed in accordance with this invention, Figure 8 is a longitudinal, sectional view of a wiper element constructed in accordance with this invention, the same being shown with a de-icing wick operatively positioned therein and taken as indicated by the lines 8—8 of Figure 9.

Figure 9 is a cross sectional view taken as indicated by the lines 9—9 of Figure 8.

The invention will now be described with reference to the particular adaptation thereof disclosed in the drawings in which there is illustrated a flat strip 7 of rubber or other suitable flexible material. The strip 7 is provided with a relatively thick edge portion having flat lateral faces 8 and 9. The strip 7 is provided on the inner face thereof adjacent each edge thereof with the flat marginal faces 10 and 11 each of which is disposed at approximately a right angle to the adjacent edge 8 or 9 of the strip 7.

The strip 7 is also provided on the inner face thereof with triangular ribs 12 and 13 which are disposed in parallel relation longitudinally thereof. Each of the ribs 12 and 13 is spaced inwardly from the adjacent edge of the strip with the outer face 14 thereof inclined upwardly and inwardly from the inner edge of the adjacent marginal surfaces 10 or 11 and with the inner face 15 thereof disposed at a right angle to the plane of the strip.

The inner face of the strip 7 is also provided over the middle portion thereof with a plurality of spaced, parallel cross ribs 16 which extend between the faces 15 on the ribs 12 and 13. The said strip is also provided on the inner face thereof along the medial line thereof with a longitudinally directed fin 17.

The outer face of the strip 7 is provided adjacent each edge thereof with an inclined, marginal face (18 or 19) which is inclined toward the opposite side of the strip. The outer face of said strip is provided along the middle portion thereof with a plurality of spaced, parallel, rectangular teeth 20 which are formed integrally with the ribs 16 and 20 with the oppositely presented bases thereof positioned in approximately the same plane, thereby providing a plurality of rectangular apertures 21.

It will be seen that the middle portion of the strip thus formed is composed of a net work formed by the strips 16 and 20. The flat strip 7 is folded with the marginal faces 10 and 11 in flat, abutting relation and the edge portions are positioned within the channel of a holder 22. The channel 22 is preferably formed of sheet metal having inwardly bulged sides forming a channel having its greatest width at the bottom thereof. As the edge portions of the strip 7 are relatively thicker than the middle portion thereof, the said portions will be held in flat, abutting relation in the holder 22.

In mounting the strip 7 in the holder 22 pressure is applied to the side walls of the holder thus forcing the inclined faces of the ribs 12 and 13 in the same plane with the abutting marginal faces 10 and 11 and causing a laterally bulging action of the central portion of the strip. The central portion thus mounted forms a tubular glass contacting portion having a cavity 23 which extends longitudinally of the holder. The fin 17 is thus normally positioned in approximately the same plane with the marginal portions 10 and 11 for a purpose to be hereinafter described.

In the modification of the invention shown in Figure 6, I have shown a blade composed of a flat strip which is provided on the contacting face thereof with a plurality of ribs 20a which are similar to the ribs 20, apertures 21a being provided between the ribs 20a to communicate with the bore or passage 23a.

In use, the wiping element herein described is mounted on a wiper arm for a laterally reciprocating movement without flopping action. As each of the ribs 20 are of rectangular form, a cutting edge is provided on each lateral side thereof which is disposed at substantially a right angle to the glass. When ordinary pressure is used in holding the particular cleaning element herein described in operative contact with the glass, two of the ribs 20 are ordinarily in contact therewith. When a greater pressure is employed, three or more ribs 20 may be brought into contact with the glass. During the extreme lateral movement of the wiping element, the operating contact may change from one rib to the other. As the tubular contacting portion of the wiping element is extremely flexible, the cleaning action does not depend upon a flopping movement but additional ribs 20 are provided on the lateral sides of the tubular portion to provide an efficient wiping action in case the same is attached to an arm which will permit a lateral rocking or flopping movement. As the element is operatively moved on a glass, a quantity of the water accumulating in front of the blade may pass through the openings 21 into the cavity 23 and flow from the downwardly presented end thereof. The ports 21 or 21a also serve to provide a wiper element having a softer, more flexible work contacting portion.

As shown in Figure 2, a movement of the element in one direction will cause the fin 17 to close the apertures 21 along the trailing edge thereof thereby preventing water from the advancing side of the wiper element to the trailing side thereof. The wiper element herein disclosed is also intended to be used in connection with an anti-freeze substance which may be employed to prevent ice from accumulating on the portion of the windshield to be cleaned. The anti-freeze substance may be in the form of a liquid, such as glycerine or may be in the form of a wick 24 adapted to be saturated with glycerine impregnated with salt or other suitable substance or in the form of a pencil or a wire or other elongated element which is coated or impregnated with an anti-freeze substance. When a liquid is used, a few drops may be placed in the upper end of the bore 23 or the impregnated wick 24 or coated wire or elongated element may be inserted in the bore. Water entering the ports 21 or 21a will distribute the solution or dissolve the anti-freeze substance which will flow through the ports 21 or 21a and will prevent ice forming thereon.

While I have shown and described a particular form of wiping element which is composed of a flat strip doubled upon itself, it is understood that the same may be molded in the shape shown in Figure 1 and that the invention is intended to apply to any form of wiper blade having a bore or channel extending longitudinally thereof with apertures leading thereto from the sides of the blade.

Having thus illustrated my invention and described the same in detail, what I claim as new and desire to secure by Letters Patent is:—

1. In a wiper, a tubular wiping element having an open bore disposed longitudinally thereof, ribs on the outer face thereof, the wall of said element having apertures, leading to said bore, said apertures positioned adjacent the outward lateral sides of said ribs for the purpose of admitting water from the advancing side of said element for escape through said bore.

2. In a wiper, a tubular wiping element having an open bore extending longitudinally therethrough, rectangular ribs on the outer face thereof, the wall of said element having apertures disposed immediately adjacent the outer lateral sides of said ribs.

3. In a wiper, a flexible, tubular wiping element having an open bore extending longitudinally therethrough, a squeegee rib on the glass contacting surface thereof, the wall of said element having apertures disposed outwardly from an outer lateral side of said rib.

4. In a wiper blade, a tubular, flexible element having an open bore extending longitudinally therethrough, a plurality of longitudinally directed wiper ribs on the executive face thereof, the wall of said element provided with openings arranged in rows disposed along the outer, lateral sides of said ribs and communicating with the bore of said element.

5. In a wiper blade, a tubular wiper element composed of flexible rubber having an open bore extending longitudinally therethrough, a plurality of longitudinally directed, parallel rectangular ribs formed integrally therewith on the outer face thereof, the wall of said wiping element provided with openings arranged in longitudinally directed rows positioned outwardly from and adjacent the outer lateral sides of said ribs.

6. In a wiper blade, a tubular, flexible rubber wiper portion having an open bore extending longitudinally therethrough, the wall of said portion provided with apertures arranged in rows positioned laterally outward from the glass contacting surface thereof.

7. In a wiper blade, a channeled holder, a tubular flexible rubber wiper portion mounted therein, said portion having an open bore extending longitudinally therethrough, the wall of said portion provided with apertures arranged in longitudinally directed rows positioned laterally outward from the glass contacting surface thereof.

8. In a wiper blade, a flexible, tubular wiping element, a plurality of longitudinally directed wiping ribs on the executive face thereof, cross ribs on the interior face thereof, the walls of said element having openings positioned laterally from the lateral edges of said wiping ribs.

9. In a wiper blade, a flexible, tubular wiping element, a plurality of longitudinally directed wiping ribs on the executive face thereof, cross ribs on the interior face thereof, the walls of said element having openings communicating with the bore of said element at points between said cross ribs.

10. In a wiper element, a flexible tubular element having a glass contacting portion composed of longitudinally directed wiping ribs; cross ribs formed integrally therewith and supporting said wiping ribs, said ribs forming a net work with openings therebetween whereby water removed by said wiping ribs may escape through the bore of the element.

11. In a wiper element, a flexible, tubular element having a glass contacting portion composed of longitudinally directed wiping ribs, cross ribs formed integrally therewith and supporting said wiping ribs, said ribs forming a net work with openings therebetween whereby water removed by said wiping ribs may escape through the bore of the element and a longitudinally directed fin projecting inwardly from the interior face of the glass contacting portion of said element whereby a lateral wiping movement of the element in either direction will distort the element and cause said fin to close the openings on the trailing side thereof.

12. In a wiper blade, a channeled holder, a substantially flat strip of rubber folded with its opposite edge portions received in said holder, with the middle portion of said strip forming a tubular work contacting portion, said work contacting portion provided with longitudinally directed ribs, said strip having spaced openings disposed in longitudinally directed rows with one of the rows positioned laterally outward from each rib.

13. In a wiper blade, a channeled holder, a substantially flat strip of rubber folded with its opposite edge portions received in said holder, with the middle portion of said strip forming a tubular work contacting portion, said strip provided on the executive face thereof with centrally positioned, longitudinally directed ribs, said strip having spaced openings disposed in longitudinally directed rows with one of the rows positioned between adjacent ribs, and an integrally formed fin projecting from the inner face of said strip and extending along the medial line thereof.

14. A wiper blade comprising a metallic U-shaped channel holder, a flexible tubular wiping element comprising a strip of rubber having the longitudinal marginal edges thereof arranged within said channel to provide a forward glass contacting wall and a rear wall connected to said channel, said tubular wiper element being open at each end and having the outer surface of said forward wall thereof provided with a plurality of longitudinally extending wiping ribs, a longitudinally extending resilient fin disposed within said tubular structure secured to and projecting from one of said walls, said fin proportioned to extend across the open tubular structure and bear against the other of said walls upon a flexing of the blade during operation.

15. In a wiper blade, a tubular wiper element composed of flexible rubber having an open bore extending longitudinally therethrough, a plurality of longitudinally directed parallel rectangular ribs formed integrally therewith on the the outer face thereof, the wall of said wiping element provided with openings arranged in longitudinally directed rows positioned outwardly from and adjacent the outer lateral sides of said ribs and ice dissolving means arranged within said tubular structure operative to discharge an ice dissolving mixture through said openings.

16. In a wiper, a flexible, tubular wiping element having an open bore extending longitudinally therethrough and providing a front glass contacting wall and opposed side walls, a squeegee rib on the glass contacting surface thereof, the wall of said element having apertures disposed outwardly from an outer lateral side of said rib and said side walls having a thickness exceeding the thickness of said front glass contacting wall.

RAYMOND A. RODRICK.